United States Patent [19]

Strandjord

[11] Patent Number: 5,767,968
[45] Date of Patent: Jun. 16, 1998

[54] COHERENT PICKUP ERROR CANCELLATION DEVICE

[75] Inventor: Lee K. Strandjord, Tonka Bay, Minn.

[73] Assignee: Honeywell Inc., Minneapolis, Minn.

[21] Appl. No.: 586,017

[22] Filed: Dec. 29, 1995

[51] Int. Cl.$^6$ .................................................. G01C 19/72
[52] U.S. Cl. .................................................. 356/350
[58] Field of Search .................... 356/350; 385/12, 385/14

[56] References Cited

U.S. PATENT DOCUMENTS

| | | |
|---|---|---|
| 5,018,860 | 5/1991 | Bielas et al. ........................... 356/350 |
| 5,039,220 | 8/1991 | Arditty et al. ........................... 356/350 |
| 5,137,357 | 8/1992 | Ferrar et al. ........................... 356/350 |

*Primary Examiner*—Samuel A. Turner
*Attorney, Agent, or Firm*—John G. Shudy, Jr.

[57] ABSTRACT

A device for eliminating coherent pickup error in a fiber optic gyroscope. The polarity of the drive signal to the phase modulator of the gyroscope is switched periodically. The scale factor consequently changes. The phase and amplitude of coherent pickup error generated in the gyroscope circuits do not change during the switching. Therefore, nearly all of the coherent pickup error is subtracted out of the gyroscope signal during the digital signal processing of the signal.

21 Claims, 7 Drawing Sheets

COHERENT PICKUP ERROR CANCELLATION DEVICE

BACKGROUND

Coherent pickup may become an issue at the 0.001 degree per hour bias stability level. There are many ways that coherent pickup can couple into the signal path and be demodulated into a rate bias. Typically, the FOG sensor consist of a gyroscope package which houses all the optics, photodetector and preamplifier. The gyroscope package is connected to an electronics board by wires which carry electrical power and signals. The electronics board typically consists of analog to digital and digital to analog converters, a digital signal processing chip and other components to provide a clock and conditioned power supplies (see FIG. 1). Coherent pickup can couple into the signal channel through the power supplies or ground paths on both the electronics board or the gyroscope package. Coherent pickup can electromagnetically or magnetically couple to the wires connecting the gyroscope to the electronics board or the wires inside the gyroscope package, or couple from the integrated optics chip to the photodetector or light source.

Figure 1:
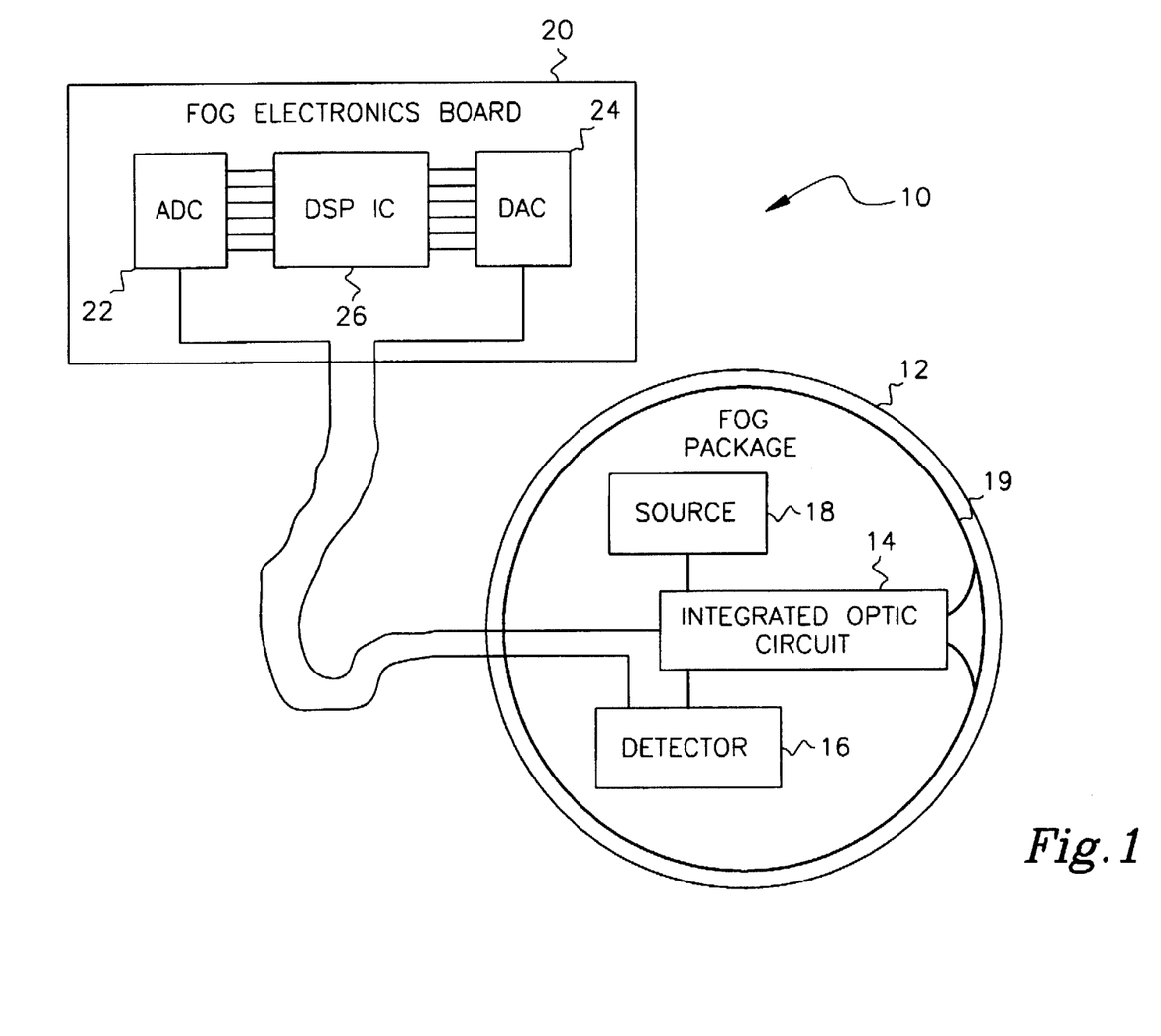
FIG. 1 is a block diagram revealing various areas in the FOG where coherent pickup can get into the signal channel.

FIG. 1 is a block diagram of a fiber optic gyroscope (FOG) system 10 showing various places in gyroscope package 12 and gyroscope electronics board 20 where coherent pickup can get into the signal channel. Gyroscope 12 houses an integrated optics chip (IOC) 14, photodetector (PD) 16, light source (LS) 18, sensing loop 19, and other optics. Electronics board 20 holds an analog-to-digital converter (ADC) 22, a digital-to-analog converter (DAC) 24, digital signal processing chip (DSP) 26, and other electronic components.

After all possible measures have been taken to reduce or eliminate coherent pickup through proper board layout, grounding and shielding, any residual coherent pickup can be canceled by using special modulation and signal processing techniques. The basic method of coherent pickup cancellation is to periodically change the sign of the gyroscope output scale factor without changing the phase or amplitude of the coherent pickup. One way this is done in the laboratory is the sensing axis of the gyroscope is rotated 180 degrees by flipping the gyroscope.

If gyroscope 10 is under rotation, the gyroscope output corresponding to the rotation will change sign when the gyroscope is flipped. However, if there is a component of the gyroscope output that corresponds to coherent pickup, this component will not change in sign, assuming flipping the gyroscope does not have any effect on the phase or amplitude of the coherent pickup. To cancel the coherent pickup from the total gyroscope output, the output corresponding to one gyroscope orientation is subtracted from the output corresponding to the other orientation. Since the sign of the output that corresponds to rotation changes from one orientation to the other, then the subtraction yields a value that is equal to twice the actual rotation. However, since the phase of the coherent pickup did not change, then the subtraction cancels the output components that correspond to coherent pickup.

SUMMARY OF THE INVENTION

Flipping the gyroscope is typically not practical for a gyroscope operation in the field. However, switching the sign of the gyroscope scale factor can be done electronically, thus simulating the effect of flipping the gyroscope. There are several ways to switch the sign of the scale factor and it is important to use a method like the present one that has the least effect on the phase and amplitude of the coherent pickup.

To reduce such error, the polarity of the modulation driver signal to the phase modulator is switched at a frequency that is a fraction (e.g., one-third or one-sixth) of the bias modulation proper frequency. The scale factor sign changes as a result. The coherent pickup error is subtracted out of the gyroscope signal during digital signal processing. The coherent pickup error cancellation device can be used with a closed loop fiber optic gyroscope. The feedback scheme used in the present embodiment is a dual ramp approach disclosed in U.S. Pat. No. 4,869,592, issued Sep. 26, 1989, by Ralph Bergh, entitled "Method and Apparatus for Obtaining a Digital Measure of Absolute Rotation," which is hereby incorporated in this disclosure by reference. However, serrodyne and digital phase step closed loop feedback schemes may be used in conjunction with the present coherent pickup error cancellation device. The present invention may also be implemented in an open loop fiber optic gyroscope.

DESCRIPTION OF THE EMBODIMENT

Figure 2:
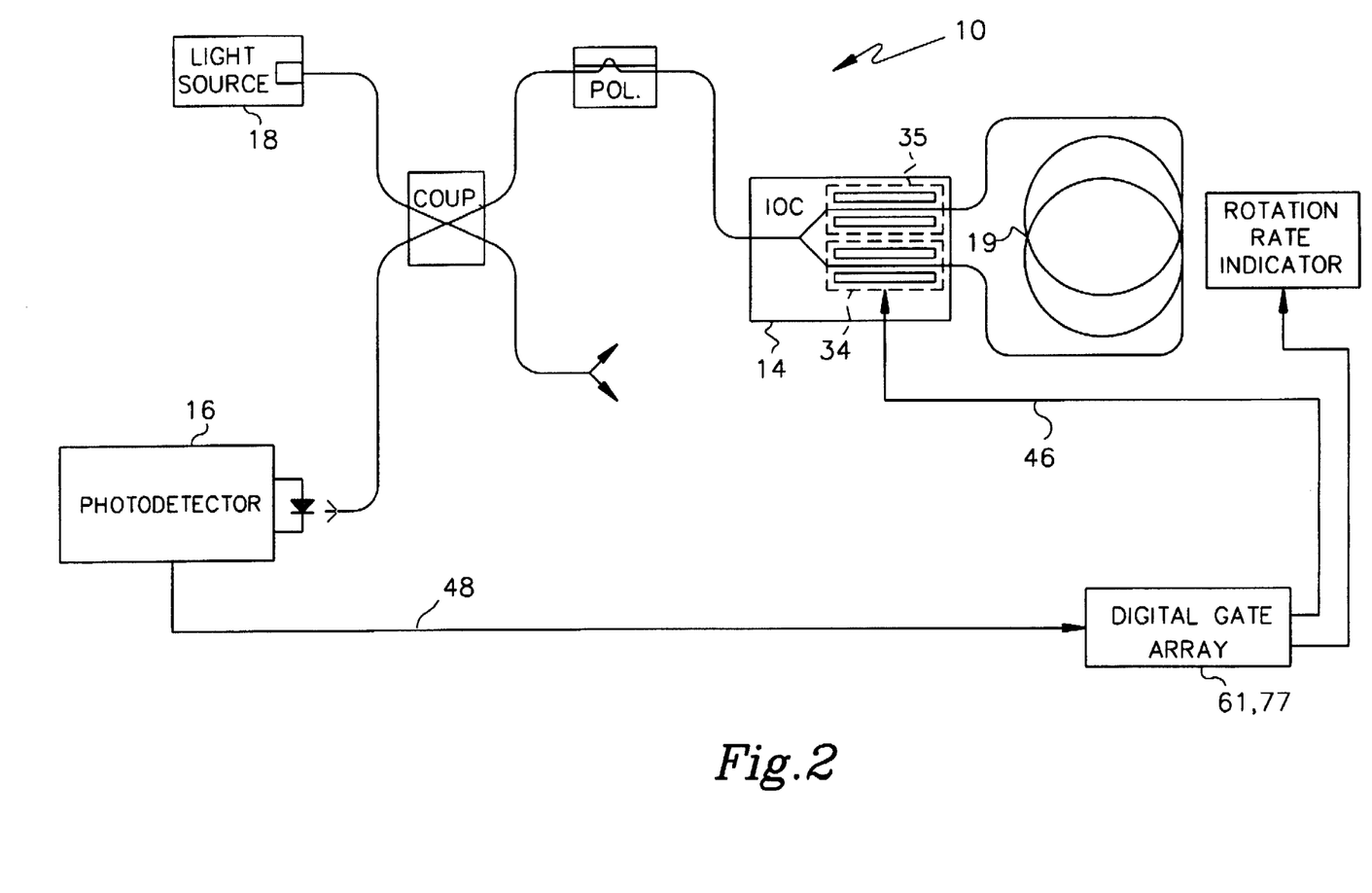
FIG. 2 shows a closed-loop fiber optic gyroscope incorporating the present device for eliminating coherent error pickup.
Figure 3A:
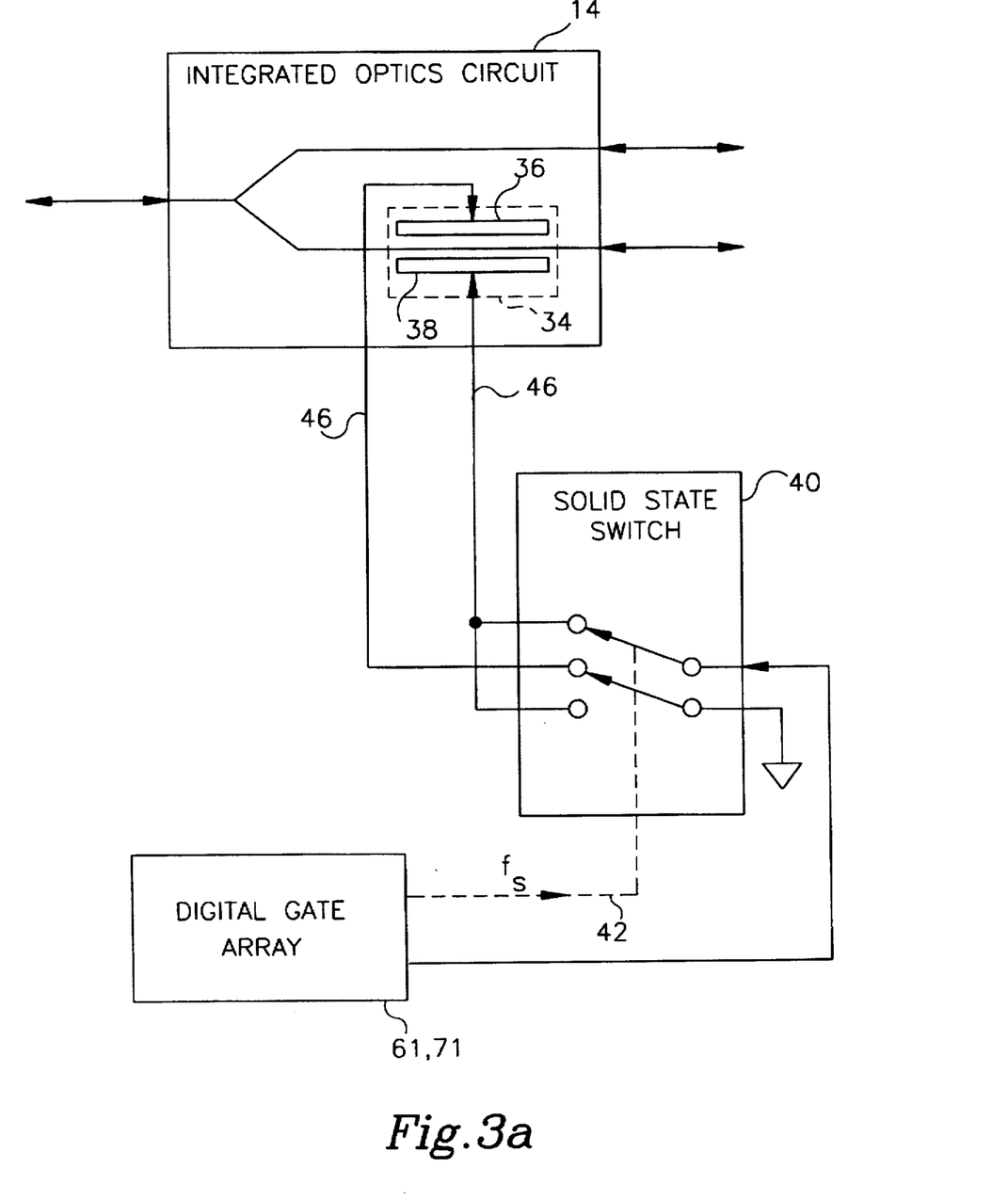
FIGS. 3a and 3b show a technique for canceling coherent error pickup, using one and two modulators, respectively.
Figure 3B:
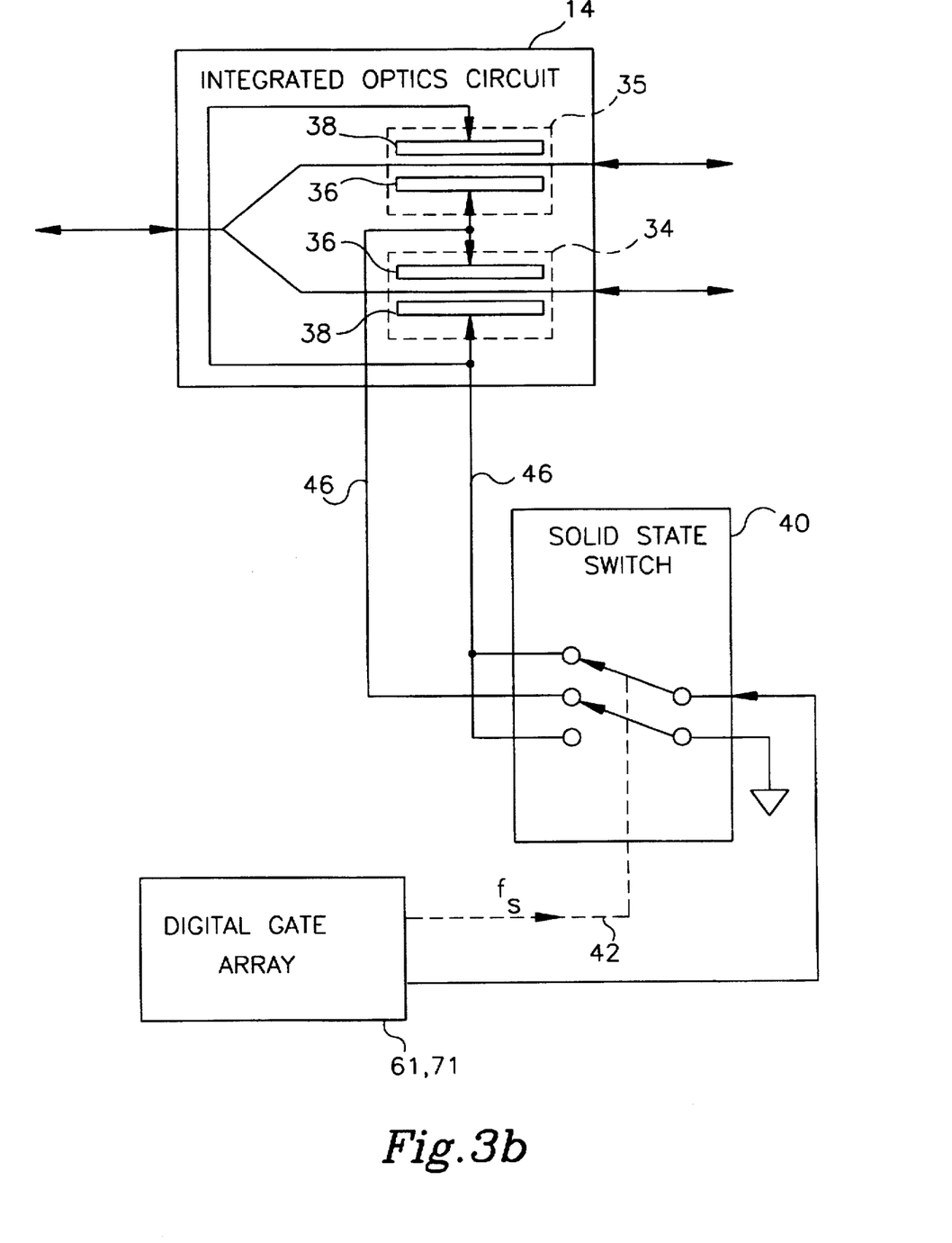

The present invention switches the polarity of the drive modulation on the electrodes of the integrated optics chip (IOC) 14 to cancel coherent pickup. FIG. 2 illustrates the use of phase nulling and pickup error canceling electronics 61, 77 in fiber optic gyroscope 10. FIGS. 3a and 3b show a circuit 30 employing this technique. One way of driving a phase modulator 34 on IOC 14 is to ground one electrode 36 and drive another electrode 38 with a bias modulation. If the connections to electrodes 36 and 38 of phase modulator 34 are switched, then the sign of the gyroscope scale factor changes, thus partially producing the effects of flipping gyroscope 10. Furthermore, if the switching of connections to electrodes 36 and 38 take place at phase modulator 34, then the phase and amplitude of coherent pickup error generated in any part of the gyroscope circuits (except phase modulator 34 itself) will not change during the switching. Therefore, practically all the coherent pickup can be subtracted out of the gyroscope signal during the digital signal processing, much the same way it was done in the example of flipping the gyroscope. Since the switching of the scale factor sign is done electronically, the switching can be done at a relatively high frequency, above the frequency of any rate changes or fluctuations of coherent pickup. The phase modulator may be other than electrodes of an IOC. It may be instead a piezoelectric modulator in sensing loop 19.

Circuit 30 of FIG. 3a cancels coherent pickup. The polarity of bias modulation is switched periodically by switching which IOC 14 electrodes 36 and 38 get energized by bias modulation. Very small solid-state switches 40 are used to perform the switching. Preferably, switches 40 would be packaged with IOC 14 and placed near electrodes 36 and 38, as to minimize the coherent pickup associated with the signal lines between phase modulator 34 and the switches 40. A signal 42 used to control switches 40 can be derived from a modulation polarity control logic in DSP chip 26, where the timing is performed by software. Furthermore, the subtraction to cancel the coherent pickup error is performed in logic of DSP chip 26 with software. Another configuration of driving the phase modulators consists of a push-pull scheme may be used for a dual ramp operation. FIG. 3b shows how the connections are made to IOC 14 for the push-pull scheme. Here, two phase modulators 34 and 35 are used, which allow for lower drive voltages.

Figure 4:
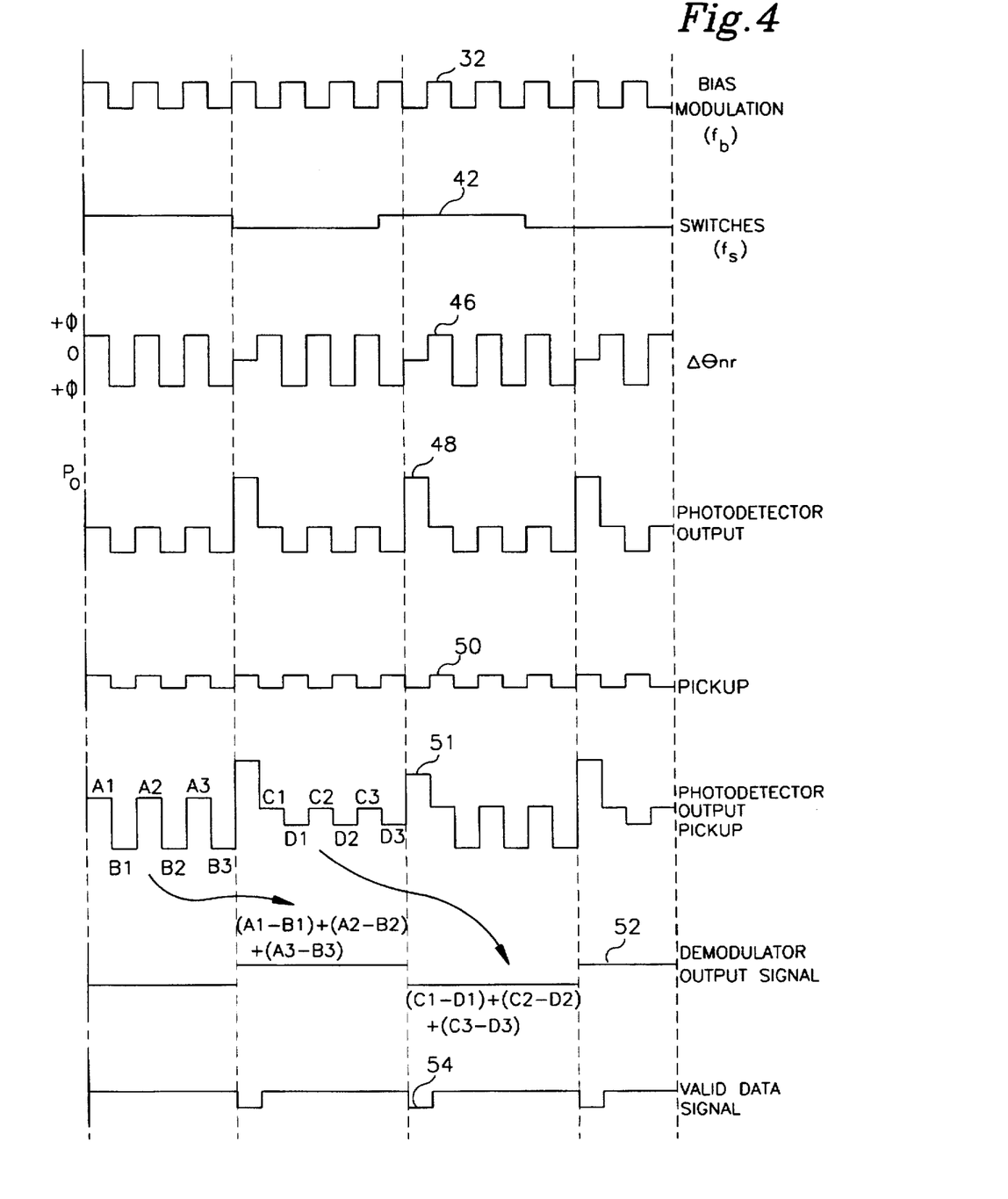
FIG. 4 is a timing diagram of selected signals corresponding to bias modulation switching for canceling coherent pickup error.

To help understand the timing of the switching and the process of subtracting out coherent pickup, a timing diagram is shown in FIG. 4. A top trace shows a square wave bias modulation drive ($f_b$) 32 is employed and the drive voltage amplitude and phase (measured not at the phase modulator 34 but any where between the circuit producing the voltage and the switches at the phase modulator) are constant over a certain period of time. Signal 42 ($f_s$) which controls switches 40 at the phase modulator 34 is shown in a second trace, which depicts the polarity of the drive voltage on phase modulator 34. Bias modulation signal 32 is a proper frequency of gyroscope 10, which typically is between 25 Khz and 100 Khz, and signal 42 is signal 32 divided by six. For this example, one chooses to switch the polarity of signal 42 for every three cycles of bias modulation 32; however, other ratios can be used and there are certain tradeoffs with different ratios.

The non-reciprocal phase modulation resulting from periodically switching the polarity of the phase modulation 32 is shown in a third trace 46. During the first three cycles of bias modulation 32, non reciprocal phase modulation 46 is shown to be in phase with drive voltage 32. When the polarity of drive voltage 42 on phase modulator 34 is switched, non reciprocal phase modulation 46 ($\Delta\Theta nr$—phase difference of counterpropagating light waves in sensing loop 19) is zero for a half cycle of bias modulation 32. This is due to the simultaneous switching of the electrode 36 and 38 connections and drive voltage 42 at switches 40. Since the electrode 36 and 38 connections switch at the same time as the drive voltage 42, the polarity of the voltage on phase modulator 34 does not change from the last half cycle of the third cycle of bias modulation 32 to the first half cycle of the fourth cycle of the bias modulation 32. What is important is that after the first half cycle of the fourth bias modulation 32 cycle, non reciprocal phase modulation signal 46 is now 180 degrees out of phase with the bias modulation drive voltage 32; therefore, the sign gyroscope scale factor has changed.

The optical power detected at photodetector 16 is shown in a fourth trace 48. Here one assumed that the gyroscope was rotating and operating in open loop configuration, and thus showed a signal due to that rotation. Typically, the optical signal due to a rotation will be a square wave having an average offset around one-half the power Po, which is detected when the non reciprocal phase is zero. After the photodetector and preamplifier 16 convert the optical signal into an electrical signal, an analog to digital converter 22 samples the signal level many times per half cycle of bias modulation ($f_b$). Therefore, within DSP chip 26 are digital words corresponding to the values of the detected power for each half cycle of bias modulation 32. If polarity switching 42 was not employed, demodulation of the rate signal would simply consist of summing the values corresponding to the positive cycles of bias modulation to the "sign-inverted" values corresponding to the negative cycles of bias modulation 32. If polarity switching 42 is employed, then the demodulation process must be done slightly different.

The timing diagram of FIG. 4 has selected signals that correspond to an IFOG employing bias modulation and modulator switching to cancel coherent pickup. After the first three cycles of bias modulation 32, switches 40, signal switches polarity. Waveform 51 is the sum of photodetector output 48 and coherent pickup. Waveform 51 shows values A1, B1, A2, B2, A3, B3, C1, D1, C2, D2, C3 and D3. Each cycle of waveform 52 is the result of the magnitudes of the previous cycle of waveform 51. Waveform 52 takes the form of (A1−B1)+(A2−B2)+(A3−B3) during the second cycle relative to the values A1−A3 and B1−B3 of the previous cycle of waveform 51, and then it takes the form of (C1−D1)+(C2−D2)+(C3−D3) for the next previous cycle of waveform 51. Waveform 52 is an demodulator output signal. Because of polarity switching of bias modulation 32, the average value of the demodulated signal corresponding to the next three valid bias modulation cycles is proportional to the to the erroneous rate value associated with coherent pickup 50 minus the desired value associated with the real rotation. (Note that during the first half cycle of bias modulation 32 occurring just after any polarity switches, the detected signal has no rate information and therefore is not a valid data point. Any invalid values must be thrown out and not used in the signal processing. A logic signal—shown in an eighth trace 54, which is a valid data signal, is generated for removing any invalid data.) In order to remove the unwanted values corresponding to coherent pickup 50 from the values corresponding to real rotation rates, the average demodulated values 52 ($\Omega$ pickup plus $\Omega$ real, where $\Omega$ is rotation rate) associated with one bias modulation polarity is subtracted from the average demodulated values 52 ($\Omega$ pickup minus $\Omega$ real) associated with the opposite polarity.

Figure 5A:
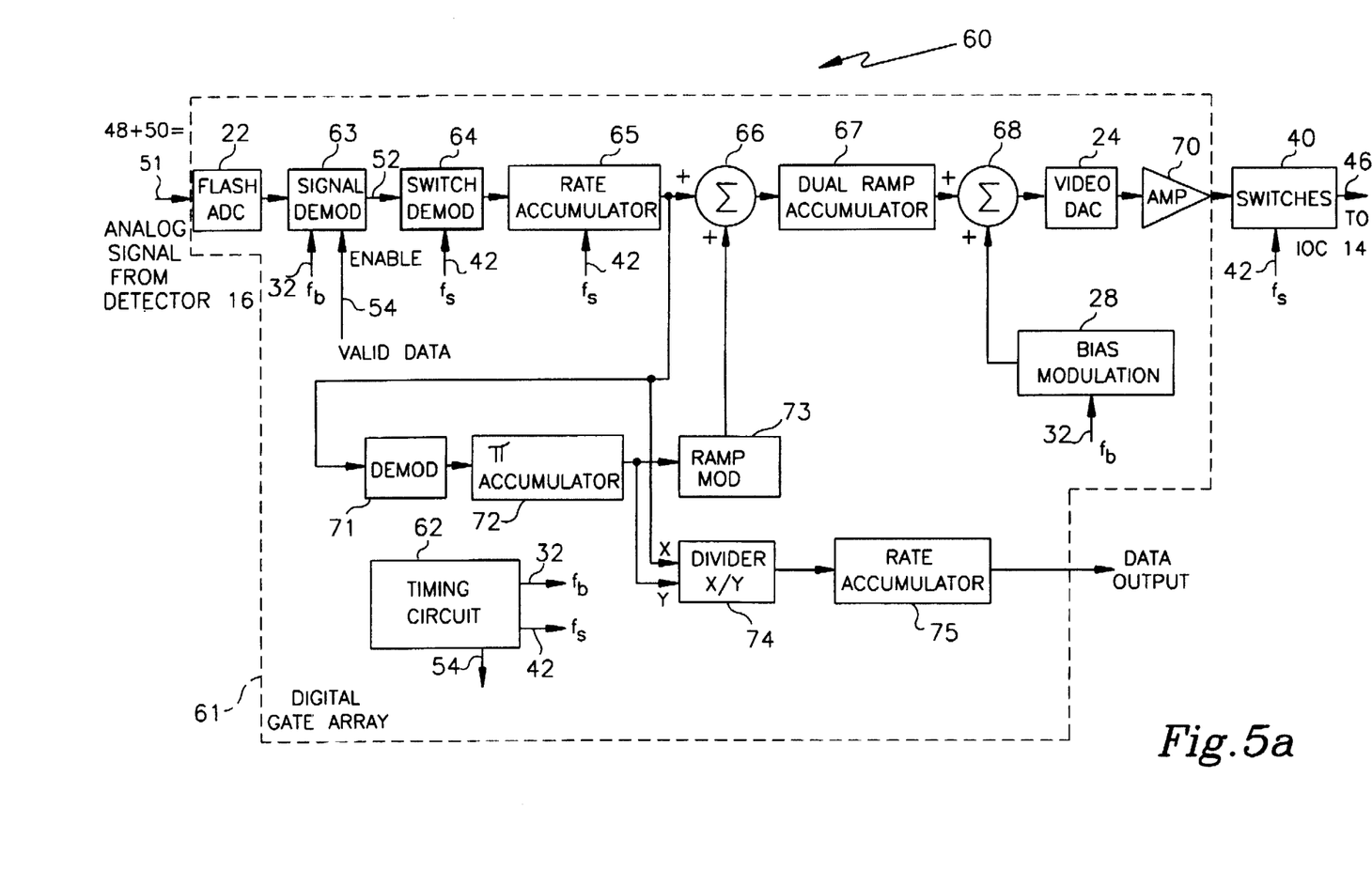
FIGS. 5a and 5b show block schematics of signal processing for pickup error cancellation.

Configuration 60 of FIG. 5a shows how the cancellation is done in a digital gate array signal processing unit 61. The analog signal having the rate information (waveforms 48 and 50 which results in waveform 51) from the gyroscope is digitized by a analog-to-digital converter 22. The digital signal is then sent to a digital gate array 61 where most of the digital signal processing occurs. The digital signal is demodulated at the bias modulation frequency $f_b$ by signal demodulator 63, which results in a demodulator output having waveform 52. Demodulator 63 has an enable feature that is controlled by a valid-data signal 54. The demodulated signal is then demodulated again at the switch frequency $f_s$ by a switch demodulator 64, which removes the erroneous information due to pickup 50. A rate accumulator 65 accumulates the output of switch demodulator 64 at the switch frequency $f_s$. The output of rate accumulator 65 is summed at a summer 66 with the dual ramp modulation produced by a modulator 73. The amplitude of the dual ramp modulation is controlled by a demodulator 71 and a $\pi$-accumulator 72. The output of a summer 66 is then accumulated by a dual ramp accumulator 67, which produces the digital waveform that maintains the Sagnac interferometer at a phase null condition. The output of dual ramp accumulator 67 is then summed at summer 68 with the bias modulation signal produced by a bias modulator 28. The output of summer 68 is then converted to an analog signal by an digital-to-analog converter 24, which is connected to an amplifier 70 that drives a phase modulator 34 on an integrated optics chip (IOC)14. Timing circuit 62 provides frequencies $f_b$ and $f_s$.

The data output (in angle) is provided by a rate accumulator 75 which accumulates the signal from an x/y divider 74. Divider 74 divides the output of the rate accumulator 65 by a $\pi$ value produced by accumulator 72.

The advantage of this implementation is that the erroneous information, due to pickup, is removed from the feedback loop that is supposed to maintain the Sagnac interferometer at phase null, that is, the counterpropagating beams in loop 19 are brought back into phase after rotation is effected. Not only is the erroneous information removed from the data output, it also does not cause the Sagnac interferometer to deviate from a phase null condition. Operating in this manner, this implementation could reduce or eliminate scale factor deadzone due to pickup. (Scale factor deadzone is where the gyroscope output is insensitive to changes in input rate and typically occurs for very low rotation rates—less than one degree per hour).

The disadvantage of this implementation is that it reduces the maximum bandwidth of the sensor. Switch demodulator 64 reduces the maximum bandwidth of the feedback loop since it is demodulating at a frequency $f_s$ which is lower than the signal demodulation frequency $f_b$. One way around this problem is to move switch demodulator 64 out of the feedback loop and place it in the data output line. This modification is shown in a configuration 80, of FIG. 5b, having a digital gate array signal processing unit 77 which is nearly the same as configuration 60 except a switch demodulator 78 is between rate accumulator 65 and divider 74, and switch demodulator 64 is removed from between signal demodulator 63 and rate accumulator 65. For configuration 60, switch demodulator 78 operates only on the output data and not on the feedback loop data, therefore not reducing the maximum bandwidth of the sensor. $f_s$ to switch demodulator 78 may be appropriately phase-shifted. An inverter 79 must be added to the feedback loop in order to cancel the sign inversion caused by the bias modulation polarity switching. $f_s$ to inverter 79 may be appropriately phase-shifted. However, inverter 79 does not reduce the bandwidth of the feedback loop. An advantage of this scheme permits a lower frequency $f_s$ without reducing the bandwidth of the feedback loop.

Figure 5B:
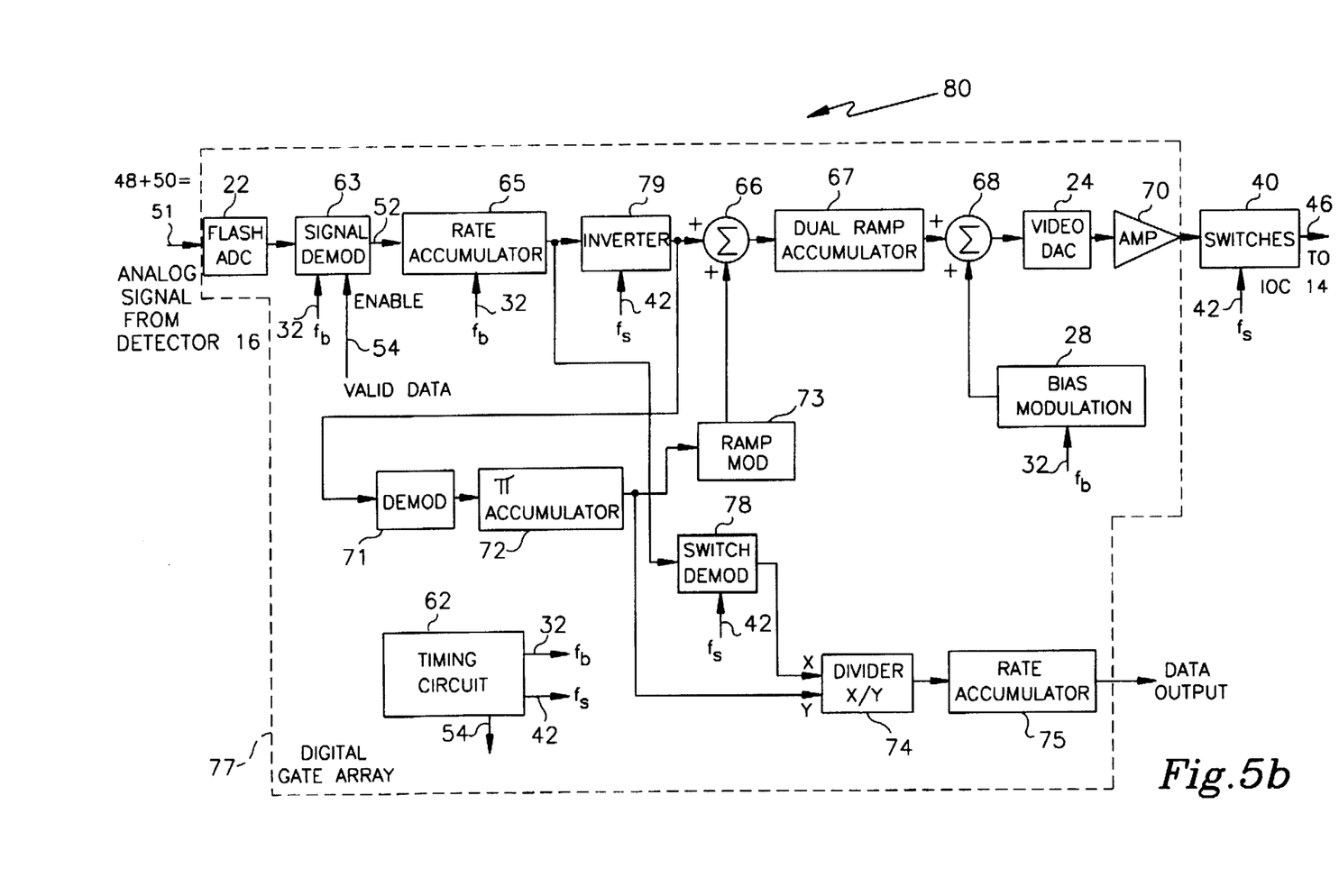

The advantage of second configuration 80 is that it does not significantly reduce the sensor bandwidth. The disadvantage of this configuration is that pickup errors will cause the Sagnac interferometer to operate slightly away from a phase null condition. This may not be a problem depending on how large the pickup is. The best configuration depends on the system bandwidth requirements and the level of pickup.

I claim:

1. A device for eliminating coherent pickup error in a fiber optic gyroscope, comprising:

a bias modulation circuit for providing a bias modulation signal having a first frequency;

a modulator having first and second electrodes;

a switch having a first terminal connected to said bias modulation circuit, a second terminal connected to a ground reference terminal, third and fourth terminals connected to the first electrode of said modulator, and a fifth terminal connected to the second electrode of said modulator, and wherein said switch has a first position that connects the first terminal to the third terminal and the second terminal to the fifth terminal, and said switch has a second position that connects the first terminal to the fifth terminal and the second terminal to the fourth terminal, wherein only one of the first and second positions can occur at a time; and modulation polarity control logic connected to said switch for switching said switch from one position to another of the first and second positions, at a second frequency; and wherein the first frequency is greater than the second frequency.

2. The device of claim 1 wherein the first frequency is a multiple of the second frequency wherein the multiple is at least two.

3. The device of claim 1 wherein the first frequency is a proper or eigen frequency of the fiber optic gyroscope.

4. A device for eliminating coherent pickup error in a fiber optic gyroscope, comprising:

a bias modulation circuit for providing a bias modulation frequency having a first frequency;

a first modulator having first and second electrodes;

a second modulator having first and second electrodes;

a switch having a first terminal connected to said bias modulation circuit, a second terminal connected to a ground reference terminal, third and fourth terminals connected to the first electrodes of said first and second modulators, and a fifth terminal connected to the second electrodes of said first and second modulators, and wherein said switch has a first position that connects the first terminal to the third terminal and the second terminal to the fifth terminal, and said switch has a second position that connects the first terminal to the fifth terminal and the second terminal to the fourth terminal, wherein only one of the first and second positions can occur at a time; and modulation polarity control logic connected to said switch for switching said switch from one position to another of the first and second positions at a second frequency; and wherein the first frequency is greater than the second frequency.

5. The device of claim 4 wherein the first frequency is a multiple of the second frequency wherein the multiple is at least two.

6. The device of claim 4 wherein the electrodes of said first and second modulators most proximate to each other are connected to the same terminal of said switch.

7. The device of claim 4 wherein the first frequency is a proper or eigen frequency of the fiber optic gyroscope.

8. A detector for receiving the output light signal and outputting a detection signal indicative of a rate of the rotation of said optical fiber loop:

a modulator, having first and second terminals, for modulating first and second beams;

a bias modulation source for providing a bias modulation signal at a first frequency on a first terminal relative to a ground reference terminal;

a switch for connecting the first terminal of said bias modulation source to the first terminal of said modulator and the ground reference terminal to the second terminal of said modulator, and then reconnecting the first terminal of said bias modulation source to the second terminal of said modulator and the ground reference terminal to the first terminal of said modulator, wherein the frequency connecting and reconnecting is less than the first frequency of the bias modulation signal.

9. The detector of claim 8 wherein the first frequency is a multiple of the second frequency wherein the multiple is at least two.

10. A coherent pickup error cancellation device comprising:

a light source for providing light;

an optical fiber loop;

a splitter, connected to said light source and said optical fiber loop, for splitting the light into two beams of light to counterpropagate in said optical fiber loop, and for combining the two beams of light that exit said optical fiber loop as output light, the two beams having a phase difference if there is rotation of said optical fiber loop, and the output light having an intensity that is indicative of the phase difference;

a detector for receiving the output light signal and outputting a detection signal indicative of a rate of rotation of said optical fiber loop;

a first modulator, having first and second terminals, for modulating the first and second beams;

a second modulator, having first and second terminals for modulating the first and second beams;

a bias modulation source for providing a bias modulation signal at a frequency a first terminal relative to a ground reference terminal; and a switch for connecting the first terminal of said bias modulation to the first terminals of said first and second modulators and the ground reference terminal to the second terminals of said first and second modulators, and then reconnecting the first terminal of said bias modulation source to the second terminals of said first and second modulators and the ground reference terminal to the first terminals of said first and second modulators, wherein the frequency of connecting and reconnecting is less than the frequency of the bias modulation signal.

11. The device of claim 10 further comprising:

a feedback loop connected to said detector and to said first and second modulators; and a data output line connected to said feedback loop.

12. The device of claim 11 wherein said switch is connected within said a feedback loop.

13. The device of claim 11 wherein said switch is connected to said data output line.

14. An optical interferometer, comprising:

an optical waveguide loop;

means for providing a pair of light waves counterpropagating in. said loop;

means for combining said light waves after counterpropagating in said loop, and for providing an optical output signal indicative thereof, said combined light waves having a phase difference therebetween, a component of said phase difference being dependent on the magnitude and sense of a perturbation applied to said loop;

detection means, for detecting said optical output signal, and for providing a detection signal, a component of said detection signal being dependent on any phase difference between said combined light waves;

signal generator means for generating a drive signal;

modulator means, having a connection to said signal generator means and responsive to said drive signal, for phase modulating said counter-propagating light waves, said modulator means comprising a pair of modulators oppositely offset with respect to a center of said loop, said modulators being simultaneously excited in response to said drive signal, a parameter of said drive signal being of a constant first frequency; and switching means for reversing a polarity of the connection of said modulator means to said signal generator at a second frequency.

15. The interferometer of claim 14, wherein the first frequency a first integer multiple of the proper or eigen frequency of said optical interferometer.

16. The interferometer of claim 15, wherein the first frequency is a second integer multiple of the second frequency.

17. The interferometer of claim 14 further comprising an integrated optical device, said modulator means being fabricated on said integrated optical device, each of the pair of modulators having a pair of electrodes, and the electrode of one of the pair of modulators and the electrode of the other of the pair of modulators on the integrated optical circuit being connected to each other.

18. An optical interferometer, comprising:

an optical waveguide loop;

means for providing a pair of light waves counterpropagating in said loop;

means for combining said light waves after counterpropagating in said loop, and for providing an optical output signal indicative thereof, said combined light waves having a phase difference therebetween, a component of said phase difference being dependent on the magnitude and sense of a perturbation applied to said loop;

detection means, for detecting said optical output signal, and for providing a detection signal, a component of said detection signal being dependent on any phase difference between said combined light waves;

signal generator means for generating a drive signal to bias modulate the pair of light waves counterpropagating in said loop;

modulator means, having a connection to said signal generator means and responsive to said drive signal, for phase modulating said counter-propagating light waves, said modulator means being offset from a center of said loop, and said drive signal having a constant first frequency; and switching means for reversing a polarity of the connection of said modulator means to said connection of said modulator means to said signal generator at a second frequency.

19. The interferometer of claim 18, wherein the first frequency a first integer multiple of the proper or eigen frequency of said optical interferometer.

20. The interferometer of claim 19, wherein the first frequency is a second integer multiple of the second frequency.

21. The interferometer of claim 18, further comprising an integrated optical device, said modulator means being fabricated on said integrated optical device, the pair of modulators having a pair of electrodes, and the adjacent electrodes not of the same modulator on the integrated optical circuit being connected to each other.

* * * * *